(12) United States Patent
Thompson

(10) Patent No.: US 7,395,918 B2
(45) Date of Patent: Jul. 8, 2008

(54) EXTENDIBLE CONVEYOR

(76) Inventor: Charles P. Thompson, 29603 Serenity La., Murrieta, CA (US) 92563

( * ) Notice: Subject to any disclaimer, the term of this patent is extended or adjusted under 35 U.S.C. 154(b) by 255 days.

(21) Appl. No.: 11/272,597

(22) Filed: Nov. 14, 2005

(65) Prior Publication Data

US 2007/0108021 A1 May 17, 2007

(51) Int. Cl.
*B65G 15/60* (2006.01)
(52) U.S. Cl. .................... 198/812; 196/594; 193/35 TE
(58) Field of Classification Search ......... 198/586–594, 198/595, 812; 193/35 TE
See application file for complete search history.

(56) References Cited

U.S. PATENT DOCUMENTS

| | | | | |
|---|---|---|---|---|
| 3,289,816 | A | * | 12/1966 | Baechli ................. 198/562 |
| 3,434,584 | A | * | 3/1969 | Winkler ................. 198/594 |
| 3,780,843 | A | * | 12/1973 | McGovern et al. ...... 193/35 TE |
| 3,876,060 | A | * | 4/1975 | Stease ................. 193/35 TE |
| 3,944,037 | A | * | 3/1976 | Stease ................. 193/35 TE |
| 4,681,501 | A | * | 7/1987 | Edwards et al. .......... 414/789.5 |
| 5,307,917 | A | * | 5/1994 | Hall ................. 198/313 |
| 5,685,416 | A | * | 11/1997 | Bonnet ................. 198/812 |
| 5,755,308 | A | * | 5/1998 | Lindstrom et al. ............ 186/66 |

2004/0094391 A1 * 5/2004 Schaum et al. .............. 198/812

FOREIGN PATENT DOCUMENTS

DE    4023585    *  9/1991    .............. 193/35 TE

OTHER PUBLICATIONS

Technical Data Sheet of the Sparks Belting Company of Grand Rapids, Michigan for Powered Conveyor Rollers (which the Patent Office examiner may consider as prior art).

* cited by examiner

*Primary Examiner*—James R Bidwell
(74) *Attorney, Agent, or Firm*—Loyal McKinley Hanson

(57) ABSTRACT

An extendible conveyor apparatus includes a first end, a second end, and an adjustable-length bed of rollers extending in between them. A sliding frame (or extension) mounted moveably on a support structure supports a fixed number of the rollers, while a moveable string of rollers connected to a second end of the frame feeds additional rollers into and out of position between the second end of the conveyor apparatus and the frame according to frame movement between retracted and extended positions of the frame. In one embodiment, the bed of rollers includes at least some motor-driven rollers (MDRs) and the string of rollers withdraws to a position below the bed using an extend/retract drive mechanism having a drive chain disposed in a loop, the frame being connected to an upper side of the loop for frame-moving purposes and the string of rollers being connected to a lower side of the loop for string withdrawal purposes.

19 Claims, 8 Drawing Sheets

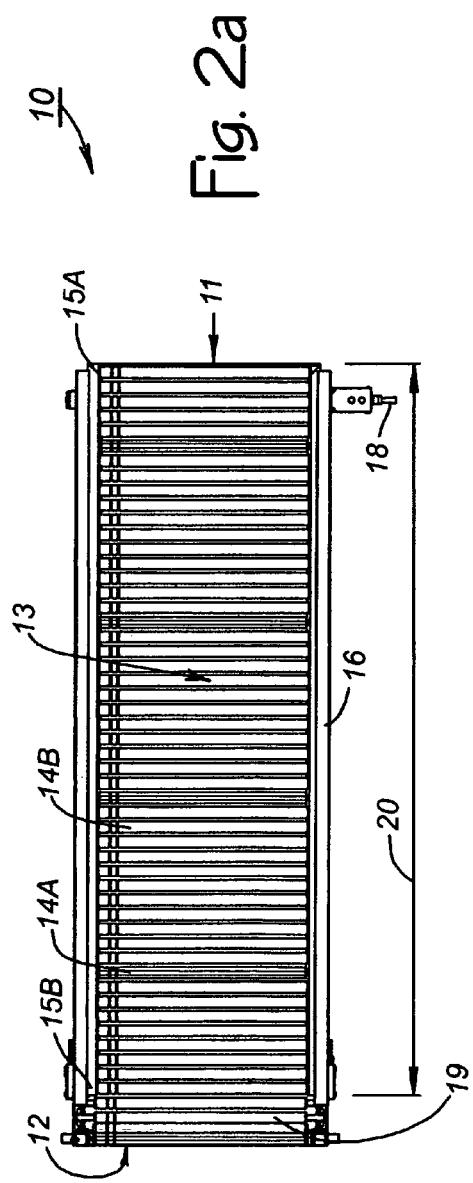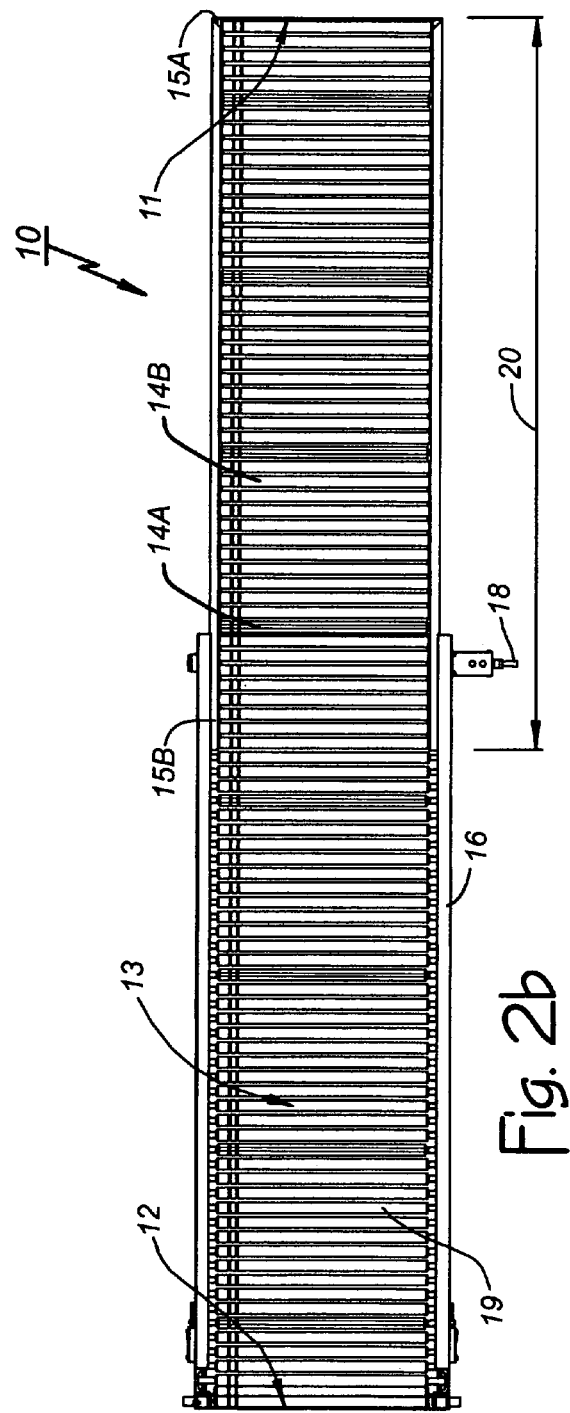

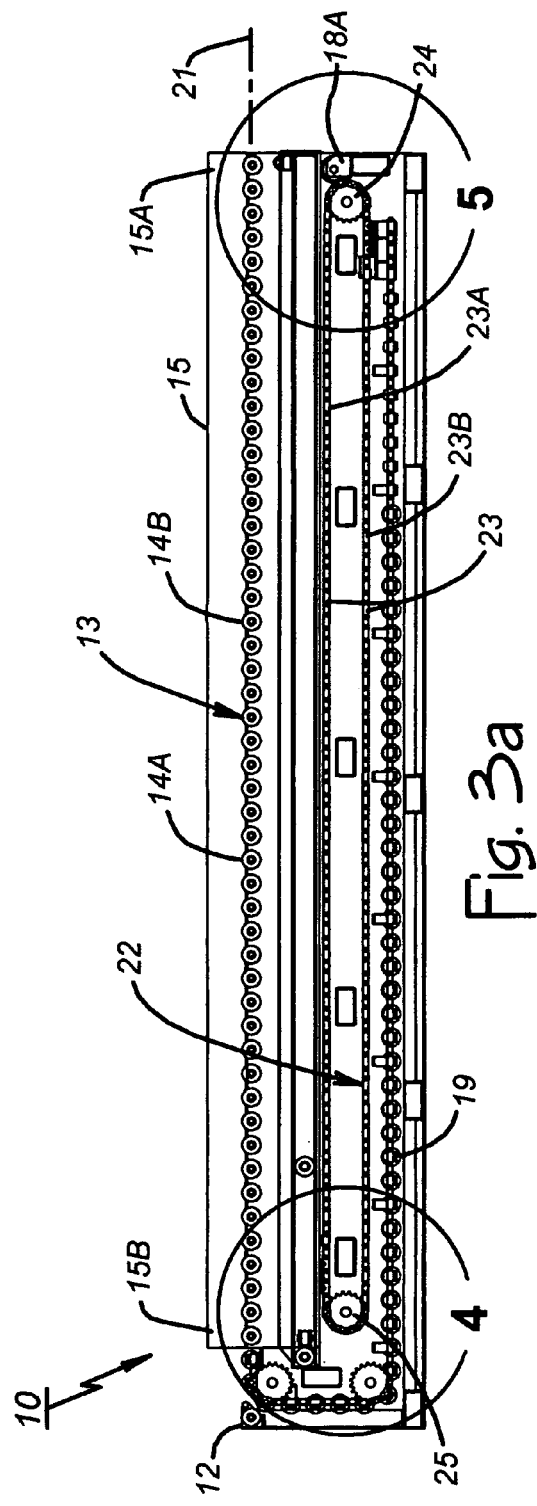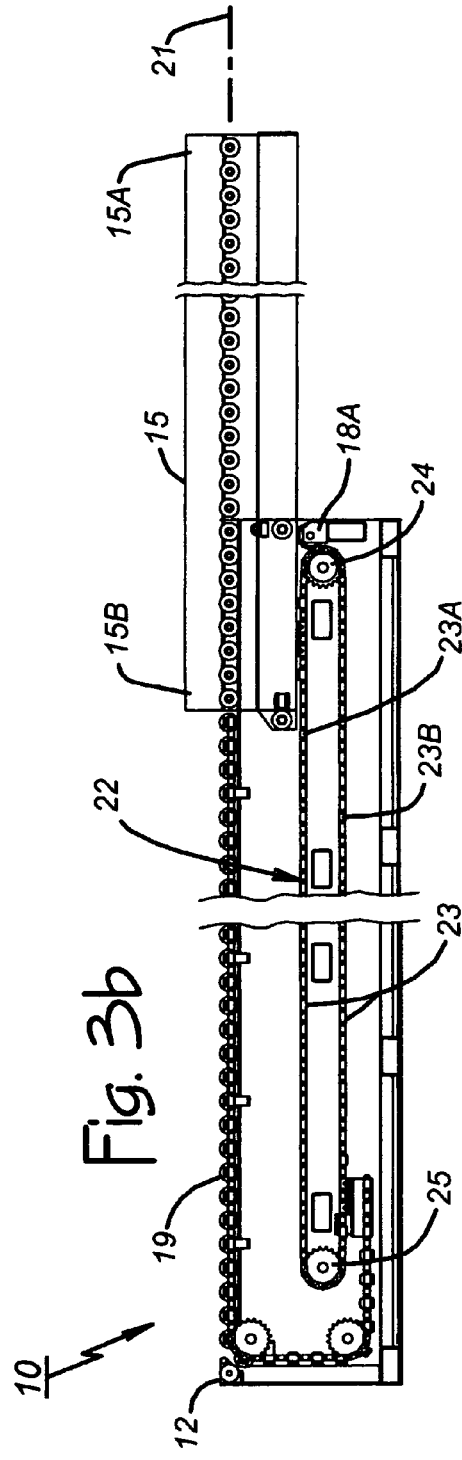

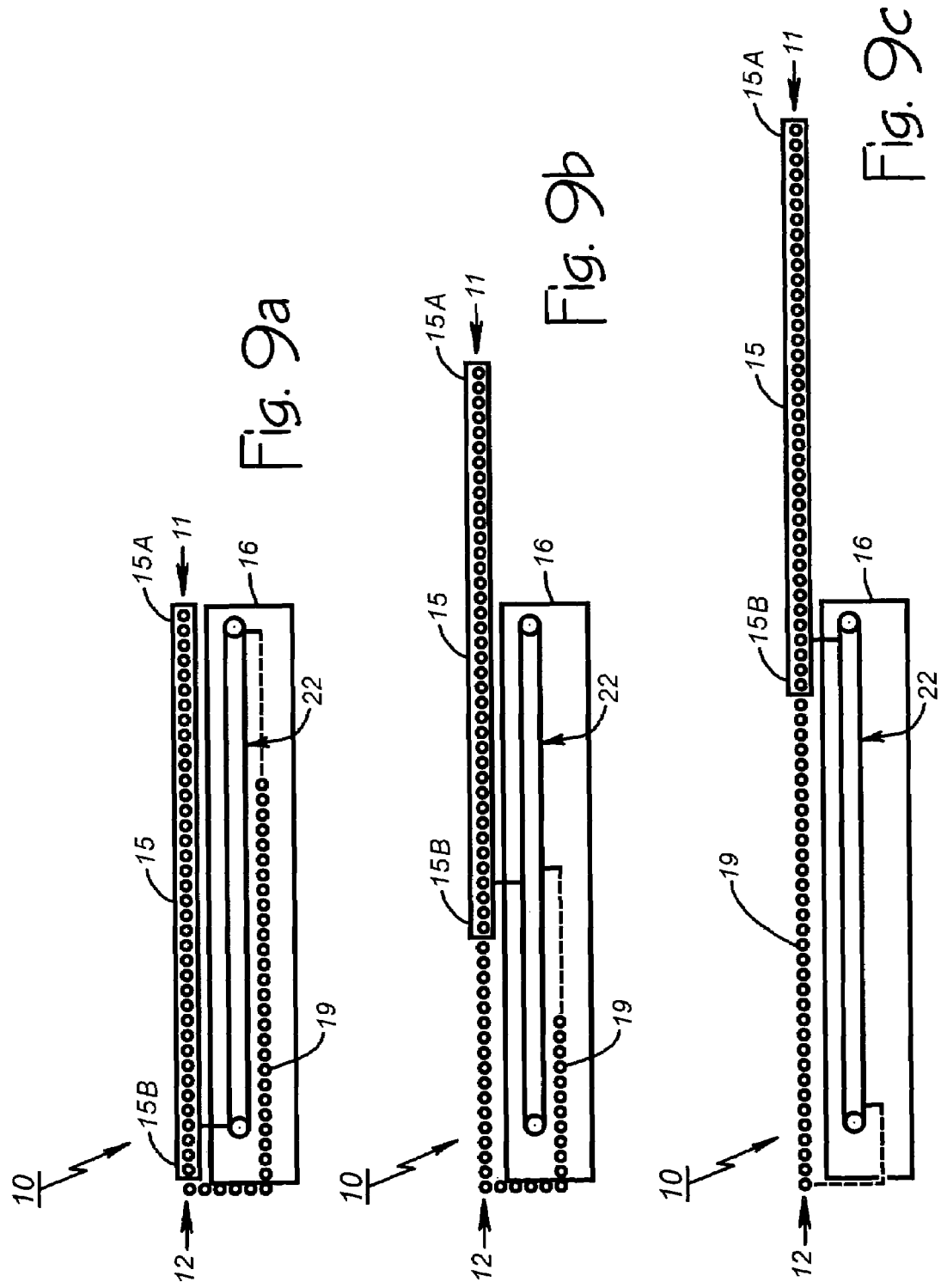

EXTENDIBLE CONVEYOR

BACKGROUND OF THE INVENTION

1. Technical Field

This invention relates generally to conveyors and conveyor systems, and more particularly to an extendible conveyor apparatus with rollers arranged in an adjustable-length bed suitable for any of various conveyor applications.

2. Description of Related Art

Some conveyor applications require a conveyor that the user can adjust in overall length. The user can lengthen or shorten the conveyor to suit operating needs. A typical existing gravity conveyor, for example, might include multiple fixed-length, skate wheel conveyor sections in overlapping relationship. The amount of overlap is adjusted to achieve the desired overall length. An existing form of belt conveyor, might include multiple fixed-length belt conveyor sections and belt-to-belt transfer plates. Yet another existing form of conveyor might include spaced-apart rollers mounted between extendible side rails having crisscrossed members that enable a user to extend them something like a scissors boom.

Although effective in many respects, existing conveyors often have certain problems that make them unsuited for many extendible conveyor applications. Gravity conveyors rely on gravity to move the parcels or other objects being conveyed. They don't work when level or inclined upwardly. In addition, overlapping gravity conveyor sections result in abrupt vertical steps between overlapping sections that may be unacceptable. Multiple-belt conveyors involve weight, noise, and complicated construction, and extendible conveyors with scissor-boom-like side rails cause roller spacing to change when moved between retracted and extended positions. For these and other reasons that will become more apparent from the following description, users need a better extendible conveyor.

SUMMARY OF THE INVENTION

This invention addresses the concerns outlined above by providing an extendible conveyor apparatus having an adjustable-length bed of rollers. An extendible frame (also referred to as a "slide frame" and as an "extension") supports a fixed number of the rollers, while a moveable string of rollers feeds additional rollers into and out of position behind the extendible frame according to movement of the frame. This arrangement of an extendible frame with a flexible string of rollers attached results in an adjustable-length bed of rollers. In that way, the invention provides an extendible conveyor apparatus having an adjustable-length bed that avoids many concerns of existing adjustable-length conveyors.

To paraphrase some of the more precise language appearing in the claims and further introduce the nomenclature used, the invention provides a conveyor apparatus having a first end (e.g., a receiving end), a second end (e.g., a discharge end), and an adjustable length between the first and second ends. A bed of rollers extends from the first end of the conveyor apparatus to the second end, and a moveable frame supports a fixed number of the rollers. The frame extends from a first end of the frame that is the first end of the conveyor apparatus to a second end of the frame that is disposed toward the second end of the conveyor apparatus. The frame is supported moveably for movement relative to the second end of the conveyor apparatus, between retracted and extended positions of the frame.

According to a major aspect of the invention, means are provided for feeding additional rollers into and out of position between the second end of the conveyor apparatus and the second end of the frame according to movement of the frame. The means for doing so includes a moveable string of rollers connected to the second end of the frame. As an operator moves the frame toward the extended position (thereby lengthening the conveyor apparatus), the string of rollers follows the frame to feed additional rollers into position between the second end of the conveyor apparatus and the second end of the frame. As the operator moves the frame toward the retracted position (thereby shortening the conveyor apparatus), the string of rollers is withdrawn so that an appropriate number of rollers are withdrawn from the bed of rollers according to frame position.

In a preferred embodiment of the invention, the string of rollers includes at least some motor-driven rollers (MDRs), with the rollers being supported by a pair of flexible side rails disposed in spaced-apart parallel relationship to each other. The rotational axes of the rollers extend between the flexible side rails in spaced-apart parallel relationship to each other. Preferably, the flexible side rails include first and second chain members. In addition, the string of rollers is arranged so that with the frame in the retracted position, the string of rollers extends downwardly from the discharge end of the conveyor apparatus to a storage position of the chain of rollers below the second end of the conveyor apparatus (beneath the moveable frame). The string of rollers is arranged (i) so that as the frame is moved from the retracted position to the extended position, the string of rollers is pulled by the frame into a position between the second end of the conveyor apparatus and the second end of the frame, and (ii) so that as the frame is moved from the extended position to the retracted position, the string of rollers is withdrawn to a storage position of the string of rollers below the second end of the conveyor apparatus.

The means for supporting the frame moveably includes a support structure on which the frame is mounted moveably, and means on the support structure for moving the frame under operator control between the retracted and extended positions. The means for moving the frame is arranged to withdraw the string of rollers as the frame is moved toward the retracted position. Preferably, the means for doing so includes a drive mechanism beneath the frame having a drive chain disposed in a loop, with the frame being connected to an upper first side of the loop for frame-moving purposes and the string of rollers being connected to a lower second side of the loop for string withdrawal purposes. The action of an operator moving the drive chain with a hand crank mechanism moves the frame, with the string of rollers following frame movement.

Thus, the invention avoids many concerns of existing adjustable-length conveyors by providing an extendible conveyor apparatus having an adjustable-length bed of rollers. An extendible frame supports a fixed number of the rollers, while a moveable string of additional rollers feeds the additional rollers into and out of position in the bed according to movement of the frame. The following illustrative drawings and detailed description make the foregoing and other objects, features, and advantages of the invention more apparent.

BRIEF DESCRIPTION OF THE DRAWINGS

FIG. 2a is a top plan view of the extendible conveyor apparatus with the extendible frame in a fully retracted position;

FIG. 2b is a top plan view of the extendible conveyor apparatus with the extendible frame in a fully extended position;

FIG. 3a is an enlarged side elevation view of the conveyor apparatus with the extendible frame in the fully retracted position;

FIG. 3b is a side elevation view similar to FIG. 3a but with the extendible frame in the fully extended position and the conveyor apparatus foreshortened for illustrative purposes;

FIG. 4 shows details of the conveyor apparatus components identified with a circle 4 in FIG. 3a;

FIG. 5 shows details of the conveyor apparatus components identified with a circle 5 in FIG. 3a;

FIG. 9a is a diagrammatic view of the essential elements of the conveyor apparatus with the extendible frame in the fully retracted position;

FIG. 9b is a diagrammatic view of the conveyor apparatus with the extendible frame in a partially extended position; and FIG. 9c is a diagrammatic view of the conveyor apparatus with the extendible frame in the fully extended position.

DESCRIPTION OF THE PREFERRED EMBODIMENTS

Figure 1:
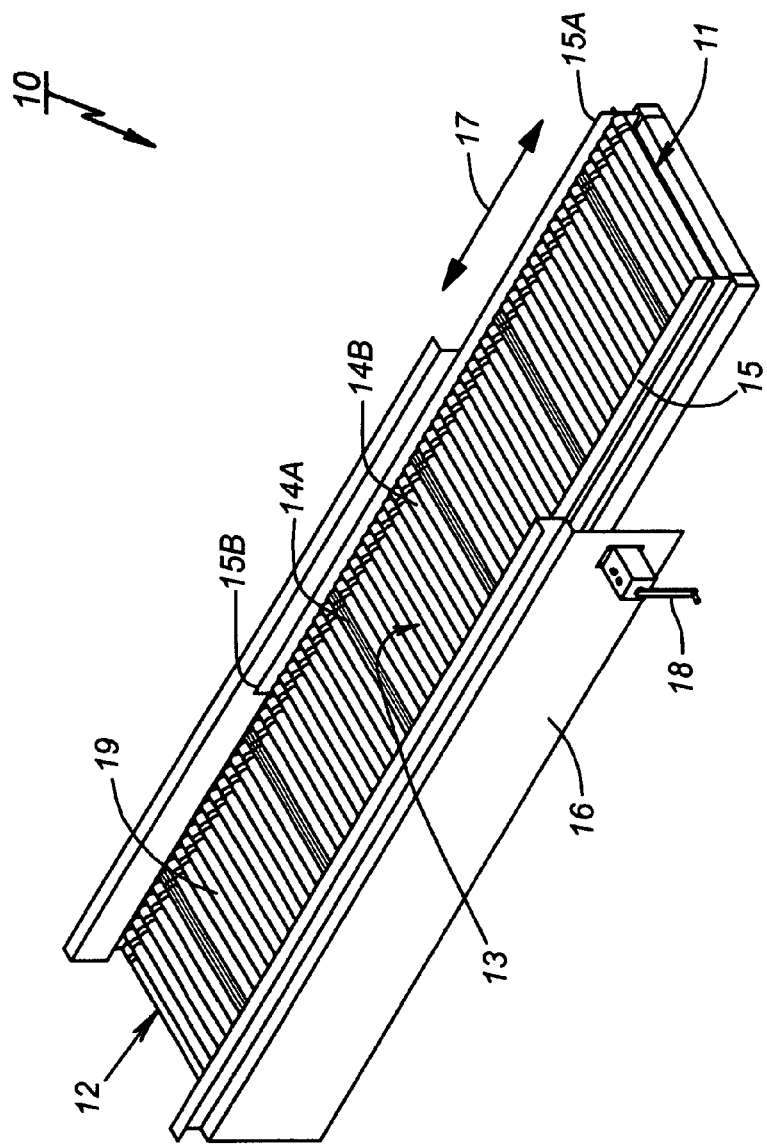
FIG. 1 of the drawings is a three-dimensional view of the top, first or receiving end, and right side of an extendible conveyor apparatus constructed according to the invention, with the extendible frame shown in a partially extended position.

The drawings show various aspects of an extendible conveyor apparatus 10 constructed according to the invention. Generally, the conveyor apparatus 10 includes a first end 11 (e.g., a receiving end), a second end 12 (e.g., a discharge end), and a bed 13 of rollers extending between the first and second ends 11 and 12 of the conveyor apparatus 10 (FIG. 1). For the illustrated conveyor apparatus 10, the bed 13 of rollers includes at least some motor-driven rollers 14A (the MDRs 14A are shaded for ease of identification) and some unpowered rollers 14B. Just a single motor-driven roller 14A and a single unpowered roller 14B are identified in FIG. 1 for illustrative purposes.

A moveable frame 15 supports a fixed number of the rollers 14A and 14B on a support structure 16. The frame 15 extends from a first end 15A of the frame 15 that is the first end 11 of the conveyor apparatus 10, to a second end 15B of the frame 15 that is disposed toward the second end 12 of the conveyor apparatus 10. The frame 15 is mounted moveably on the support structure 16 for movement relative to the second end 12 of the conveyor apparatus 10 as depicted by a double-headed arrow 17 in FIG. 1. The support structure 16 helps serve the function of supporting the frame 15 moveably for movement relative to the second end 15B of the conveyor apparatus 10, between retracted and extended positions of the frame 15. An operator (not shown) turns a crank handle 18 to move the frame 15 and thereby adjust the length of the bed 13 of rollers (i.e., adjust the length of the conveyor apparatus 10).

According to a major aspect of the invention, the conveyor apparatus 10 includes means for feeding additional rollers 14A and 14B into and out of position between the second end 12 of the conveyor apparatus 10 and the second end 15B of the frame 15 according to movement of the frame 15. The means for doing so includes a moveable string 19 of rollers connected to the second end 15B of the frame 15. As the frame 15 moves in a first direction to increase the length of the bed 13 of rollers, the string 19 of rollers follows the frame 15 and thereby feeds additional rollers 14A and 14B into position between the second end 12 of the conveyor apparatus 10 and the second end 15B of the frame 15. As the frame 15 moves in an opposite direction to decrease the length of the bed 13, the string 19 of rollers is withdrawn so that rollers 14A and 14B are withdrawn from their position in the bed 13 of rollers.

FIGS. 2a and 2b are top plan views of the conveyor apparatus 10 that illustrate the frame 15 in the fully retracted and fully extended positions of the frame 15. The length of the frame 15 is depicted by a double-headed arrow dimension line 20 in FIGS. 2a and 2b. The frame 15 is shown in a fully retracted position of the frame 15 in FIG. 2a and in a fully extended position of the frame 15 (FIG. 2b).

As an idea of size, the illustrated conveyor apparatus 10 is roughly about 11 feet long between the first and second ends 11 and 12 of the conveyor apparatus 10, while the moveable frame 15 is roughly about 10 feet long between the first and second ends 15A and 15B of the frame 15. Of course, those dimensions may vary significantly according to the particular conveyor design without departing from the inventive concepts disclosed.

As for the motor-driven rollers 14A, they may take the form of commercially available powered conveyor rollers having 24-volt internal direct current (DC) motors, such as, for example, the 20-inch long powered conveyor rollers available from Sparks Belting Company of Grand Rapids, Mich. The unpowered rollers 14B are similar in exterior size and shape to the MDRs 14A, but they do not include an internal motor. The MDRs 14A are spaced apart sufficiently to accommodate eleven unpowered rollers 14B in between two MDRs 14A. Every twelfth roller is an MDR 14A. The unpowered rollers 14B are driven by the MDRs 14A, being coupled mechanically to the MDRs 14A by O-ring couplings or other suitable coupling means. Suitable electrical wiring and control circuitry (not shown) couples electrical power to the MDRs 14A. The MDRs 14A are shaded in FIGS. 1, 2a, and 2b for illustrative purposes to highlight this arrangement.

Notice with reference to FIGS. 3a and 3b that for the illustrated conveyor apparatus 10, the bed 13 of rollers is flat. In other words, the rotational axes of those rollers 14A and 14B that occupy positions in the bed 13 of rollers, all lie in a common plane 21 without abrupt vertical steps, and thus the bed 13 of rollers is flat. The roller surface of the bed 13 of rollers is continuous and in a common plane without vertical steps, even as the length of the bed 13 of rollers is changed. From the foregoing and subsequent descriptions, one of ordinary skill in the art can readily implement the invention so that the rotational axes of those rollers 14A and 14B that occupy positions in the bed 13 of rollers do not lie in a common plane, thereby resulting in a bed of rollers that extends in a gradual curve instead (i.e., the resulting bed of rollers is not flat). Such variations are intended to fall within the inventive concepts disclosed and the broader claims subsequently presented.

FIGS. 3a and 3b also illustrated further details of the string 19 of rollers and a drive mechanism 22. According to one aspect of the invention, the conveyor apparatus 10 includes means on the support structure 16 for moving the frame 15 under operator control between the retracted and extended positions of the frame 15 and for withdrawing the string 19 of rollers as the frame 15 is moved toward the retracted position. The drive mechanism 22 helps serve this function. It includes a chain 23 disposed in a loop over sprockets 24 and 25. The frame 15 is connected to an upper first side 23A of the loop and the string 19 of rollers is connected to a lower second side 22B of the loop.

As the operator turns the crank 18 mentioned previously with reference to FIG. 1, a crank mechanism 18A (of which the crank 18 is a part) causes the chain 23 to move over the sprockets 24 and 25 and that causes the frame 15 to move between the retracted and extended positions of the frame 15. Turning the crank 18 in a first direction (e.g., clockwise) moves the frame 15 toward the extended position. Turning the crank in an opposite second direction (e.g., counterclockwise) moves the frame 15 toward the retracted position while also withdrawing the string 19 of rollers.

Stated another way, the support structure 16 supports the frame 15 moveably, and means are provided on the support structure 16 for moving the frame 15 under operator control between the retracted and extended positions. The means for doing so also withdraws the string 19 of rollers as the frame 15 is moved toward the retracted position. The drive mechanism 22 does this, including the chain 23 disposed in a loop, with the frame 15 being connected to a first side 23A of the loop for frame-moving purposes and the string 19 of rollers being connected to a second side 23B of the loop for string withdrawal purposes. The string 19 of rollers is arranged so that with the frame 15 in the retracted position, the string 19 of rollers extends downwardly from the second end 12 of the conveyor apparatus 10 to a storage position of the string 19 of rollers below the second end 12. As the frame is 15 moved from the retracted position to the extended position, the string 19 of rollers is pulled by the frame 15 into a position between the second end 12 of the conveyor apparatus 10 and the second end 15B of the frame 15. As the frame 15 is moved from the extended position to the retracted position, the string 19 of rollers is withdrawn to a storage position of the string 19 of rollers below the second end 12 of the conveyor apparatus 10.

Figure 4:
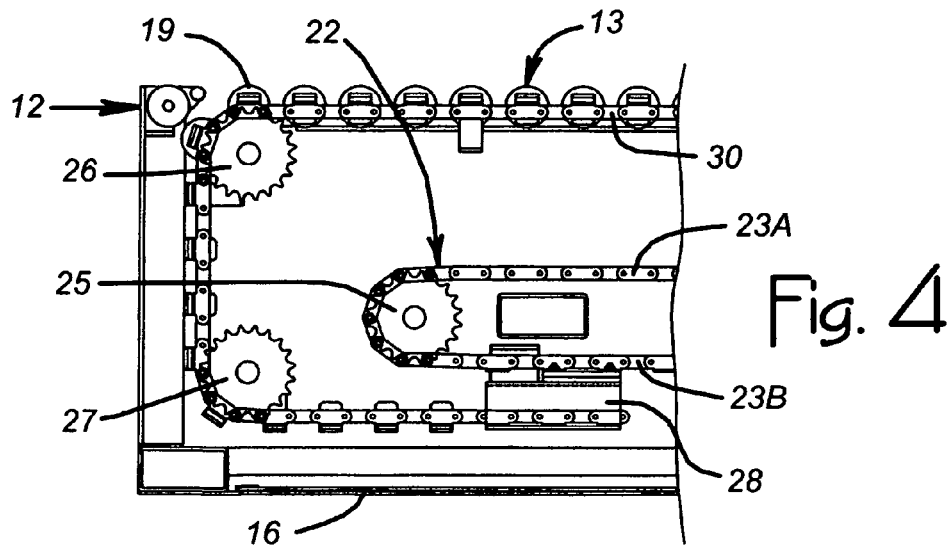
Figure 5:
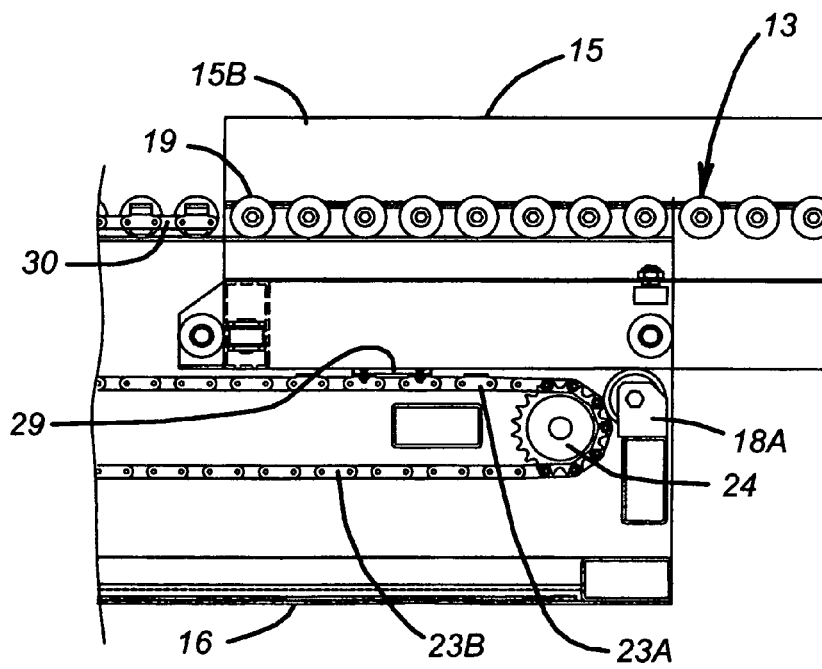

FIGS. 4 and 5 are enlarged views showing further details of the connections to the chain 23. The string 19 of rollers loops over sprockets 26 and 27 (FIG. 4) in extending from second end 12 to a position beneath the bed 13 of rollers where it is connected to the second side 23B of the loop in which the chain 23 of the drive mechanism 22 is disposed. A suitable connector assembly 28 (FIG. 4) serves to connect the string 19 of rollers to the second side 23B of the loop, while a suitable connector arrangement 29 (FIG. 5) serves to connect the frame 15 to the first side 23A.

The string 19 of rollers is a flexible assembly of a series of multiple rollers connected in a line so that the string 19 of rollers can change direction and move over the sprockets as illustrated and described. The illustrated string 19 of rollers includes a pair of flexible side rails disposed in spaced-apart parallel relationship to each other, and a plurality of rollers extending between the flexible side rails. For the illustrated conveyor apparatus 10, the side rails include first and second chain members disposed in spaced-apart parallel relationship to each other, just one chain member 30 being identified in FIGS. 4 and 5. The chain member 30 may, for example, take the form of a known and commercially available American National Standards Institute (ANSI) standard steel roller chain (e.g., double pitch K-1 attachment chain available from McMaster-Carr Supply Company).

Figure 6:
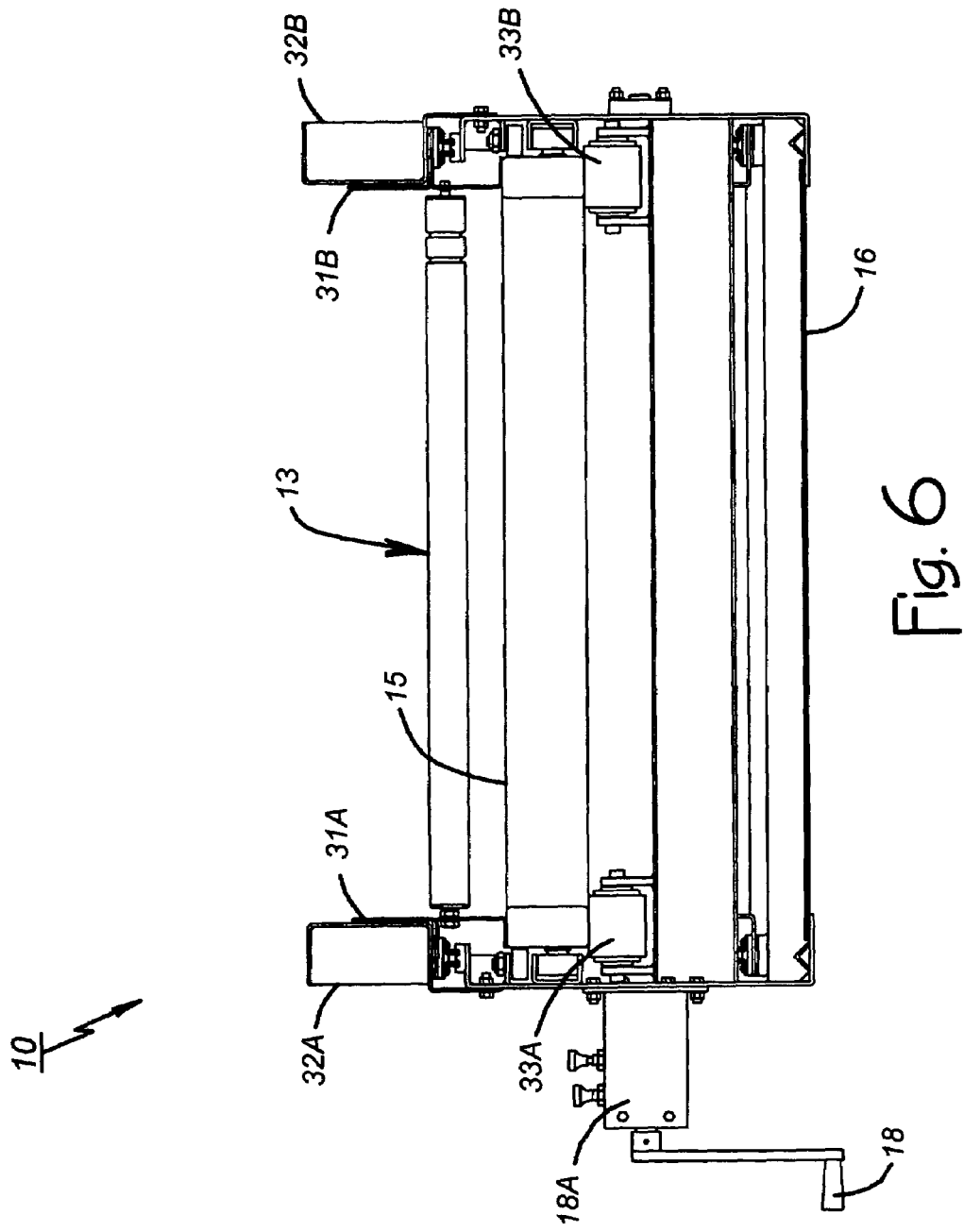
FIG. 6 is an enlarged elevation view of the first or receiving end of the conveyor apparatus.
Figure 7:
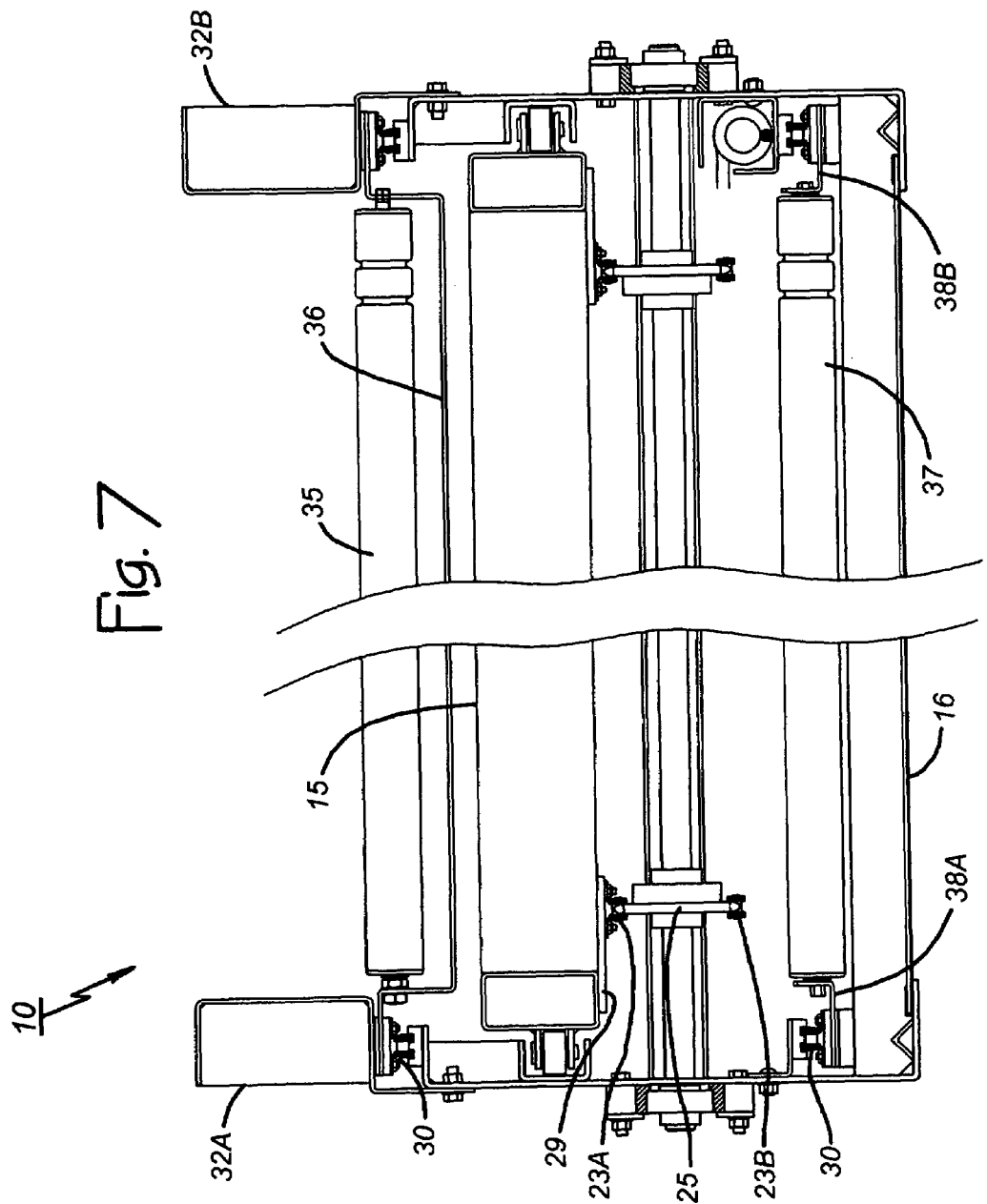
FIG. 7 is an enlarged elevation view as viewed in a transverse plane disposed intermediate the first or receiving end and the second or discharge end of the conveyor apparatus.
Figure 8:
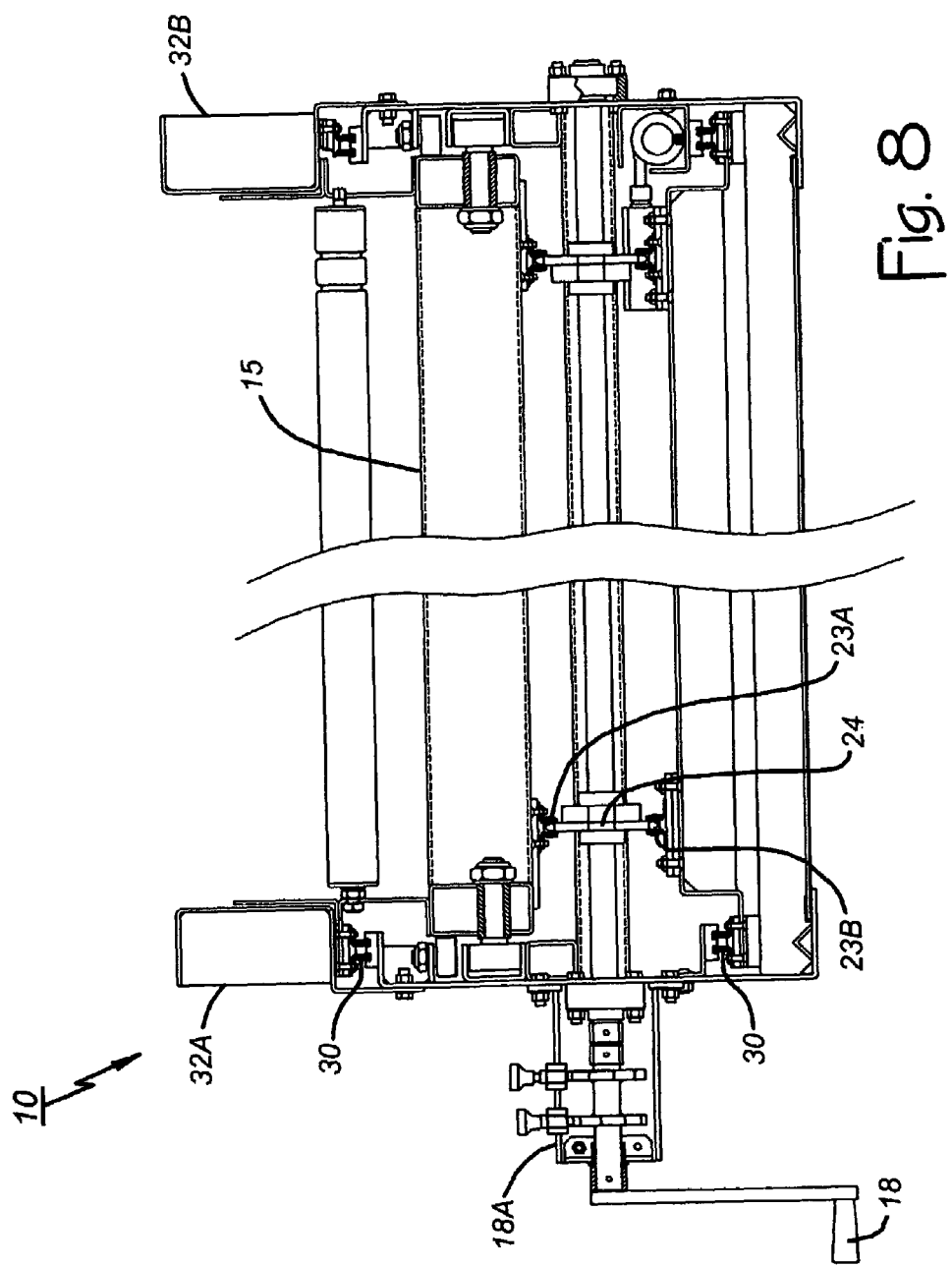
FIG. 8 is an enlarged elevation view of as viewed in a transverse plane extending through the crank mechanism.

FIG. 6 is an enlarged elevation view of the first end 11 of the conveyor apparatus 10. The frame 15 includes optional side guards 31A and 31B. Removable side guards 32A and 32B help partition the bed 13 of rollers from the surrounding environment. The frame 15 slides on rollers 33A and 33B FIG. 7 is a further enlarged elevation view as viewed in a transverse plane extending through the string 19 of rollers intermediate the second end 12 of the conveyor apparatus 10 and the second end 15B of the frame 15. An MDR 35 is shown mounted on a full-width roller support bracket 36. Full-width roller support brackets occur every 15 inches of pitch. An unpowered roller 37 is shown mounted between mounting brackets 38A and 38B. FIG. 8 is an enlarged elevation view as viewed in a transverse plane extending through the crank mechanism.

Thus, the invention provides an extendible conveyor apparatus 10 having an adjustable-length bed 13 of rollers. An extendible frame 15 supports a fixed number of the rollers, while a moveable string 19 of rollers feeds additional rollers into and out of position in the bed 13 according to movement of the frame 15. From the foregoing and subsequent descriptions, one of ordinary skill in the art can readily implement the invention. FIGS. 9a, 9b, and 9c diagrammatically review essential elements of the conveyor apparatus 10 using the reference numerals mentioned above, with FIG. 9a showing the frame 15 in the fully retracted position, FIG. 9b showing the frame 15 in an intermediate position, and FIG. 9c showing the frame 15 in a fully extended position. Although an exemplary embodiment has been shown and described, one of ordinary skill in the art may make many changes, modifications, and substitutions without necessarily departing from the spirit and scope of the invention.

What is claimed is:

1. A conveyor apparatus having a first end, a second end, and an adjustable length between the first end and the second end, the conveyor apparatus comprising:

a bed of rollers extending from the first end of the conveyor apparatus to the second end of the conveyor apparatus;

a frame supporting a fixed number of the rollers, the frame extending from a first end of the frame that is the first end of the conveyor apparatus, to a second end of the frame that is disposed toward the second end of the conveyor apparatus;

means for supporting the frame moveably for movement relative to the second end of the conveyor apparatus, between retracted and extended positions of the frame; and means for feeding additional rollers into and out of position between the second end of the conveyor apparatus and the second end of the frame according to movement of the frame, including a string of rollers connected to the second end of the frame;

wherein the conveyor apparatus is a beltless conveyor apparatus:

wherein the means for supporting the frame moveably includes a support structure on which the frame is mounted moveably and means on the support structure for moving the frame under operator control between the retracted and extended positions while withdrawing the string of rollers as the frame is moved toward the retracted position; and wherein said means on the support structure for moving the frame under operator control includes a drive mechanism having a chain disposed in a loop, with the frame being connected to a first side of the loop for frame-moving purposes and the string of rollers being connected to a second side of the loop for string withdrawal purposes.

2. A conveyor apparatus as recited in claim 1, wherein the string of rollers includes a pair of flexible side rails disposed in spaced-apart parallel relationship to each other, and a plurality of rollers extending between the flexible side rails.

3. A conveyor apparatus as recited in claim 2, wherein the flexible side rails include first and second chain members disposed in spaced-apart parallel relationship to each other.

4. A conveyor apparatus as recited in claim 1, wherein the string of rollers is arranged so that with the frame in the retracted position, the string of rollers extends downwardly from the second end of the conveyor apparatus to a storage position of the string of rollers below the second end of the conveyor apparatus.

5. A conveyor apparatus as recited in claim 1, wherein the string of rollers is arranged (i) so that as the frame is moved from the retracted position to the extended position, the string of rollers is pulled by the frame into a position between the second end of the conveyor apparatus and the second end of the frame, and (ii) so that as the frame is moved from the extended position to the retracted position, the string of rollers is withdrawn to a storage position of the string of rollers below the second end of the conveyor apparatus.

6. A conveyor apparatus as recited in claim 1, wherein the bed of rollers includes at least some motor-driven rollers.

7. A conveyor apparatus as recited in claim 6, wherein the bed of rollers includes at least some non-motor-driven rollers that do not include a drive motor, said non-motor-driven rollers being mechanically coupled to the motor-driven rollers.

8. A conveyor apparatus having a first end, a second end, and an adjustable length between the first end and the second end, the conveyor apparatus comprising:
  a bed of rollers extending from the first end of the conveyor apparatus to the second end of the conveyor apparatus;
  a frame supporting a fixed number of the rollers, the frame extending from a first end of the frame that is the first end of the conveyor apparatus, to a second end of the frame that is disposed toward the second end of the conveyor apparatus;
  means for supporting the frame moveably for movement relative to the second end of the conveyor apparatus, between retracted and extended positions of the frame; and
  means for feeding additional rollers into and out of position between the second end of the conveyor apparatus and the second end of the frame according to movement of the frame, including a string of rollers connected to the second end of the frame;
  wherein the string of rollers includes a pair of flexible side rails disposed in spaced-apart parallel relationship to each other, and a plurality of rollers extending between the flexible side rails; and
  wherein the flexible side rails include first and second chain members disposed in spaced-apart parallel relationship to each other;
  wherein the means for supporting the frame moveably includes a support structure on which the frame is mounted moveably and means on the support structure for moving the frame under operator control between the retracted and extended positions while withdrawing the string of rollers as the frame is moved toward the retracted position; and
  wherein said means on the support structure for moving the frame under operator control includes a drive mechanism having a chain disposed in a loop, with the frame being connected to a first side of the loop for frame-moving purposes and the string of rollers being connected to a second side of the loop for string withdrawal purposes.

9. A conveyor apparatus as recited in claim 8, wherein the string of rollers is arranged so that with the frame in the retracted position, the string of rollers extends downwardly from the second end of the conveyor apparatus to a storage position of the string of rollers below the second end of the conveyor apparatus.

10. A conveyor apparatus as recited in claim 8, wherein the string of rollers is arranged (i) so that as the frame is moved from the retracted position to the extended position, the string of rollers is pulled by the frame into a position between the second end of the conveyor apparatus and the second end of the frame, and (ii) so that as the frame is moved from the extended position to the retracted position, the string of rollers is withdrawn to a storage position of the string of rollers below the second end of the conveyor apparatus.

11. A conveyor apparatus as recited in claim 8, wherein the bed of rollers includes at least some motor-driven rollers.

12. A conveyor apparatus as recited in claim 11, wherein the bed of rollers includes at least some non-motor-driven rollers that do not include a drive motor, said non-motor-driven rollers being mechanically coupled to the motor-driven rollers.

13. A conveyor apparatus having a first end, a second end, and an adjustable length between the first end and the second end, the conveyor apparatus comprising:
  a bed of rollers extending from the first end of the conveyor apparatus to the second end of the conveyor apparatus;
  a frame supporting a fixed number of the rollers, the frame extending from a first end of the frame that is the first end of the conveyor apparatus, to a second end of the frame that is disposed toward the second end of the conveyor apparatus;
  means for supporting the frame moveably for movement relative to the second end of the conveyor apparatus, between retracted and extended positions of the frame; and
  means for feeding additional rollers into and out of position between the second end of the conveyor apparatus and the second end of the frame according to movement of the frame, including a string of rollers connected to the second end of the frame;
  wherein the means for supporting the frame moveably includes a support structure on which the frame is mounted moveably and means on the support structure for moving the frame under operator control between the retracted and extended positions while withdrawing the string of rollers as the frame is moved toward the retracted position; and
  wherein said means on the support structure for moving the frame under operator control includes a drive mechanism having a chain disposed in a loop, with the frame being connected to a first side of the loop for frame-moving purposes and the string of rollers being connected to a second side of the loop for string withdrawal purposes.

14. A conveyor apparatus as recited in claim 13, wherein the string of rollers includes a pair of flexible side rails disposed in spaced-apart parallel relationship to each other, and a plurality of rollers extending between the flexible side rails.

15. A conveyor apparatus as recited in claim 14, wherein the flexible side rails include first and second chain members disposed in spaced-apart parallel relationship to each other.

16. A conveyor apparatus as recited in claim 13, wherein the string of rollers is arranged so that with the frame in the retracted position, the string of rollers extends downwardly from the second end of the conveyor apparatus to a storage position of the string of rollers below the second end of the conveyor apparatus.

17. A conveyor apparatus as recited in claim 13, wherein the string of rollers is arranged (i) so that as the frame is moved from the retracted position to the extended position, the string of rollers is pulled by the frame into a position between the second end of the conveyor apparatus and the second end of the frame, and (ii) so that as the frame is moved from the extended position to the retracted position, the string of rollers is withdrawn to a storage position of the string of rollers below the second end of the conveyor apparatus.

18. A conveyor apparatus as recited in claim 13, wherein the bed of rollers includes at least some motor-driven rollers.

19. A conveyor apparatus as recited in claim 18, wherein the bed of rollers includes at least some non-motor-driven rollers that do not include a drive motor, said non-motor-driven rollers being mechanically coupled to the motor-driven rollers.

* * * * *